United States Patent
Park et al.

(10) Patent No.: US 10,466,569 B2
(45) Date of Patent: Nov. 5, 2019

(54) BEAM STEERING DEVICE, OPTICAL APPARATUS INCLUDING BEAM STEERING DEVICE, AND BEAM STEERING METHOD

(71) Applicant: SAMSUNG ELECTRONICS CO., LTD., Suwon-si (KR)

(72) Inventors: Yeonsang Park, Seoul (KR); Younggeun Roh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 297 days.

(21) Appl. No.: 15/270,769

(22) Filed: Sep. 20, 2016

(65) Prior Publication Data

US 2017/0082907 A1    Mar. 23, 2017

(30) Foreign Application Priority Data

Sep. 21, 2015  (KR) .......................... 10-2015-0133090

(51) Int. Cl.
*G02F 1/29* (2006.01)
*G02B 6/126* (2006.01)
(Continued)

(52) U.S. Cl.
CPC .............. *G02F 1/292* (2013.01); *G02B 1/002* (2013.01); *G02B 5/008* (2013.01); *G02B 5/3016* (2013.01);
(Continued)

(58) Field of Classification Search
CPC .... G02B 27/283; G02B 27/286; G02B 27/26; G02B 6/272; G02B 6/2773; G02B 27/28; G02B 27/145; G02B 27/285; G02B 27/48; G02B 5/30; G02B 5/3083; G02B 6/278; G02B 6/2793; G02B 6/29311;
(Continued)

(56) References Cited

U.S. PATENT DOCUMENTS

| 4,931,803 A | 6/1990 | Shimko |
| 6,958,729 B1 | 10/2005 | Metz |

(Continued)

FOREIGN PATENT DOCUMENTS

| JP | 4599763 B2 | 12/2010 |
| KR | 10-2013-0030100 A | 3/2013 |

(Continued)

OTHER PUBLICATIONS

Kim, J. et al. Directional radiation of Babinet-inverted optical nanoantenna integrated with plasmonic waveguide. Sci. Rep. 5, 11832; doi: 10.1038/srep11832 (2015).*

(Continued)

*Primary Examiner* — Evan P Dzierzynski
*Assistant Examiner* — Sharrief I Broome
(74) *Attorney, Agent, or Firm* — Sughrue Mion, PLLC

(57) ABSTRACT

A beam steering device, an optical apparatus including the beam steering device, and a beam steering method are provided. The beam steering device includes a polarization converter adjusting a polarization direction of light that is emitted from a light source, and an antenna array receiving the light from the polarization converter and emitting light in different propagating direction depending on the polarization direction of the light from the polarization converter.

20 Claims, 26 Drawing Sheets

(51) Int. Cl.
*G02B 27/00* (2006.01)
*G02B 27/28* (2006.01)
*G02B 5/30* (2006.01)
*G02F 1/01* (2006.01)
*G02B 1/00* (2006.01)
*G02B 5/00* (2006.01)
*G02B 26/08* (2006.01)

(52) U.S. Cl.
CPC ............ *G02B 5/3058* (2013.01); *G02B 6/126* (2013.01); *G02B 26/08* (2013.01); *G02B 27/0087* (2013.01); *G02B 27/286* (2013.01); *G02F 1/0136* (2013.01); *G02F 2203/07* (2013.01); *G02F 2203/24* (2013.01)

(58) Field of Classification Search
CPC .... G02B 2027/0118; G02B 2027/0125; G02B 27/00; G02F 1/0136; G02F 1/0121; G02F 1/133385; G02F 2203/055; G02F 1/0123; G02F 1/13471; G02F 2203/12; G02F 1/025; G02F 1/035; G02F 1/1396; G02F 1/225; G02F 1/292; G02F 2201/17; G02F 2203/06; G02F 2203/58; G02F 2/02
USPC ....... 359/246, 245, 251, 254, 256, 238, 247, 359/279, 320, 248, 291, 301, 315, 484.01
See application file for complete search history.

(56) References Cited

U.S. PATENT DOCUMENTS

| | | |
|---|---|---|
| 2009/0274467 A1 | 11/2009 | Morris et al. |
| 2009/0284670 A1* | 11/2009 | Xue .................. G02F 1/133536 349/16 |
| 2010/0097611 A1 | 4/2010 | Song |
| 2010/0171674 A1* | 7/2010 | Henderson ............. H01Q 13/08 343/778 |
| 2012/0025185 A1 | 2/2012 | Kasamatsu |
| 2013/0070459 A1 | 3/2013 | Kim et al. |
| 2014/0376073 A1* | 12/2014 | Kim ....................... G02B 5/008 359/241 |
| 2014/0376856 A1 | 12/2014 | Roh et al. |
| 2015/0117015 A1 | 4/2015 | Roh et al. |
| 2016/0070032 A1 | 3/2016 | Kim |

FOREIGN PATENT DOCUMENTS

| | | |
|---|---|---|
| KR | 10-1472510 B1 | 12/2014 |
| KR | 10-2015-0050093 A | 5/2015 |

OTHER PUBLICATIONS

Kosako, et al., "Directional control of light by a nano-optical Yagi-Uda antenna", Nature Photonics, May 2010, vol. 4, pp. 312-315.

Anonymous, "Phased array", Wikipedia, Feb. 19, 2016, http://en.wikipedia.org/wiki/Phased_array.

Yu, et al., "Light Propagation with Phase Discontinuities: Generalized Laws of Reflection and Refraction", Science Magazine, Oct. 21, 2011, vol. 334, 6 pages total.

Sun, et al., "Large-scale nanophotonic phased array", Nature, Jan. 10, 2013, vol. 493, pp. 195-199.

Kim, et al. "Directional radiation of Babinet-inverted optical nanoantenna integrated with plasmonic waveguide", Scientific Reports, vol. 5, Jul. 2, 2015, XP 055334107, pp. 1-9.

Kim, et al., "Babinet-Inverted Optical Yagi-Uda Antenna for Unidirectional Radiation to Free Space", Nano Letters, vol. 14, Issue No. 6, Jun. 11, 2014, XP 055334229, pp. 3072-3078.

Buchnev, et al., "Electro-optical control in a plasmonic metamaterial hybridised with a liquid-crystal cell", Optics Express, vol. 21, Issue No. 2, Jan. 28, 2013, XP 055334426, 6 pages total.

Communication dated Jan. 24, 2017, issued by the European Patent Office in counterpart European Patent Application No. 16189413.4.

* cited by examiner

BEAM STEERING DEVICE, OPTICAL APPARATUS INCLUDING BEAM STEERING DEVICE, AND BEAM STEERING METHOD

CROSS-REFERENCE TO RELATED APPLICATION

This application claims priority from Korean Patent Application No. 10-2015-0133090, filed on Sep. 21, 2015, in the Korean Intellectual Property Office, the disclosure of which is incorporated herein by reference in its entirety.

BACKGROUND

1. Field

Apparatuses and methods consistent with exemplary embodiments relate to a beam steering device capable of adjusting a propagation direction of light, and more particularly, to a beam steering device capable of adjusting a propagation direction of light by using an antenna element array having an intaglio structure, an optical apparatus including the beam steering device, and a beam steering method.

2. Description of the Related Art

Recently, a variety of optical devices have been developed. Because optical devices use light, the signal processing rate of optical devices is very high. However, the signal processing rate of electrical devices having a small size of, for example, several tens to several hundreds of nanometers is lower than the signal processing rate of optical devices. Although optical devices have a high signal processing rate, it is difficult to reduce the size of optical devices to a level less than the wavelength of light because of limitations of light diffraction. Therefore, it is difficult to manufacture optical devices having a size less than several micrometers (μm). As a result, there is a limit to manufacturing integrated optical circuits using optical devices.

Optical devices such as optical array antennas have been developed. It is possible to vary the propagation direction of light using an optical array antenna by adjusting the phases of antenna elements of the optical array antenna. However, optical array antennas using a phased array are difficult to manufacture because of difficulties in connecting a fiber between antenna elements, and have a complicated structure because of a phase tuning heater.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a beam steering device capable of adjusting a propagation direction of light by varying a polarization direction of the light.

One or more exemplary embodiments provide a beam steering device capable of adjusting a propagation direction of light by using a simplified antenna array structure.

One or more exemplary embodiments provide an optical apparatus capable of adjusting a propagation direction of light by varying a polarization direction of the light.

One or more exemplary embodiments provide a beam steering method of adjusting a propagation direction of light by varying a polarization direction of the light.

According to an aspect of an exemplary embodiment, there is provided a beam steering device including a polarization converter adjusting a polarization direction of light emitted from a light source, and an antenna array receiving the light from the polarization converter and emitting light in different propagating direction depending on the polarization direction of the light from the polarization converter.

The antenna array may comprise slots disposed in different directions in a metal layer.

Each of the slots may have a cross-sectional shape with relatively long first sides and relatively short second sides, and the first sides of the slots may be disposed at different angles, respectively, from the adjusted polarization direction of the light.

The antenna array may further include grooves separate from and adjacent to the respective corresponding slots, the grooves reflecting the light beams to have the different propagation directions, respectively.

A slot and a corresponding groove, among the slots and grooves, may be arranged in a direction different from a direction in which another slot and another groove, among the slots and grooves, are arranged.

The grooves may be parallel with the respective corresponding slots.

The grooves may be sloped from the respective corresponding slots.

The beam steering device may further include another antenna array disposed in the metal layer, the another antenna array including other slots arranged in a same manner as the slots of the antenna array.

The light beams may have a same intensity.

The light beams may have different intensities, respectively.

According to an aspect of another exemplary embodiment, there is provided a beam steering device including a polarization converter adjusting a polarization direction of light emitted from a light source, a metal layer receiving the light having the adjusted polarization direction, and slots disposed in the metal layer, each of the slots having a cross-sectional shape with relatively long first sides and relatively short second sides, the first sides of the slots being disposed at different angles, respectively, from the adjusted polarization direction of the light.

The different propagation directions of the light beams may be substantially perpendicular to the respective first sides of the slots on which the light beams are incident.

The beam steering device may further include grooves disposed in the metal layer, the grooves being separate from and adjacent to the respective corresponding slots, and the grooves reflecting the light beams to have the different propagation directions, respectively.

The beam steering device may further include other slots disposed in the metal layer, the other slots being arranged in a different manner than the slots.

The polarization converter may include a liquid crystal layer.

Each of the slots may have a rectangular cross-sectional shape.

The metal layer may include at least one among titanium, gold, silver, platinum, copper, aluminum, nickel, and chromium.

The beam steering device may further include a refractor refracting the emitted light.

The refractor may have an electrically adjustable refractive index.

Each of distances of the first sides and the second sides may be less than a wavelength of the emitted light.

According to an aspect of another exemplary embodiment, there is provided an optical apparatus including a light source configured to emit light; a polarization converter adjusting a polarization direction of the emitted light; an antenna array receiving the light from the polarization converter and emitting light in different propagating direction depending on the polarization direction of the light from the polarization converter; and a display panel configured to generate images for different viewpoints, based on the light having different propagating directions emitted from the antenna array.

The metal layer may further include grooves separate from and adjacent to the respective corresponding slots, the grooves reflecting the light beams to have the different propagation directions, respectively.

According to an aspect of another exemplary embodiment, there is provided a beam steering method including adjusting a polarization direction of light that is emitted from a light source; and subjecting the light having the adjusted propagation direction to a metal layer having slots oriented in different directions with respect to the propagation direction.

Each of the slots may have a cross-sectional shape with relatively long first sides and relatively short second sides.

The first sides of the slots may be disposed at different angles, respectively, from the adjusted polarization direction of the light, and the different propagation directions of the light beams may be substantially perpendicular to the respective first sides of the slots on which the light beams are incident.

The beam steering method may further include reflecting, from grooves in the metal layer, the light beams to have the different propagation directions, respectively, the grooves being separate from and adjacent to the respective corresponding slots.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
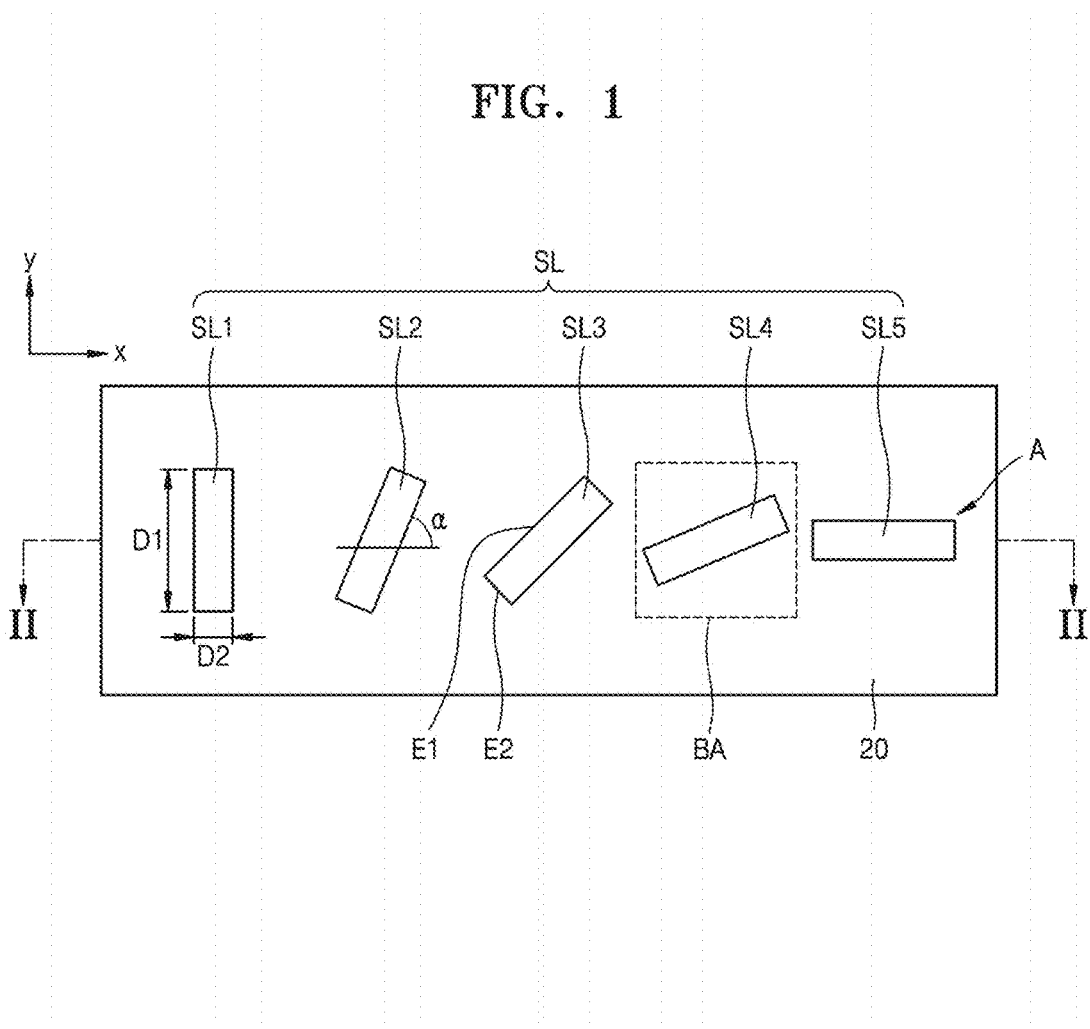
FIG. 1 is a plan view illustrating a beam steering device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may be omitted if they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

Figure 2:
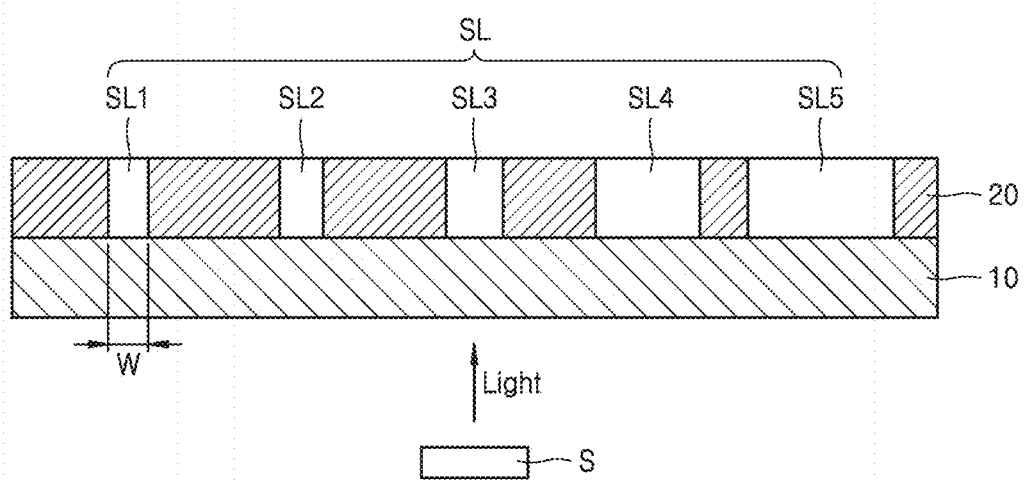
FIG. 2 is a cross-sectional view taken along a line II-II of FIG. 1.

FIG. 1 is a plan view illustrating a beam steering device according to an exemplary embodiment, and FIG. 2 is a schematic cross-sectional view taken along line II-II of FIG. 1.

Referring to FIGS. 1 and 2, the beam steering device includes a polarization converter 10 configured to adjust the polarization direction of light emitted from a light source S, a metal layer 20, and an antenna array A disposed in the metal layer 20.

For example, the light source S may include a light emitting device such as a light emitting diode (LED) or a laser diode (LD). For example, the polarization converter 10 may convert light emitted from the light source S into a polarized beam. For example, the polarization converter 10 may include a liquid crystal layer and may electrically vary the polarization direction of light. Also, the polarization converter 10 may mechanically vary the polarization direction of light. For example, the polarization converter 10 may include a polarizing plate and a driver configured to rotate the polarizing plate. The polarizing plate may be rotated to vary the polarization direction of light.

The metal layer 20 may include at least one selected from titanium (Ti), gold (Au), silver (Ag), platinum (Pt), copper (Cu), aluminum (Al), nickel (Ni), and chromium (Cr). The metal layer 20 may include an alloy of at least two among titanium (Ti), gold (Au), silver (Ag), platinum (Pt), copper (Cu), aluminum (Al), nickel (Ni), and chromium (Cr). The metal layer 20 may also be used as an electrode. For example, if the polarization converter 10 needs an electrode, the metal layer 20 may function as an electrode.

The antenna array A is disposed in the metal layer 20. The antenna array A includes a plurality of antenna elements BA configured to vary the propagation direction of light according to the polarization direction of the light.

The antenna elements BA may be basic unit structures for varying the propagation direction of light according to the polarization direction of the light. For example, the antenna elements BA may include at least one intaglio structure and the intaglio structure may include a slot SL.

The slot SL may have a cross section with a first side E1 having a relatively long length D1 and a second side E2 having a relatively short length D2. For example, the slot SL may have a rectangular cross-sectional shape. However, the cross-sectional shape of the slot SL is not limited thereto. For example, the slot SL may have a triangular, pentagonal, or hexagonal cross-sectional shape. The cross-sectional shape of the slot SL may be a cross-sectional shape in a direction transverse to the incident direction of light. For example, in FIG. 1, the light source S shown in FIG. 2 may emit light out of the page through the antenna array A. The slot SL may penetrate the metal layer 20.

For example, the slot SL may have a rectangular parallelepiped shape. The angle between the first side E1 and the second side E2 may be 90° and the slot SL may have a nano size. The nano size may range from several nanometers to several hundreds of nanometers. The slot SL may be formed through an etching process, and walls of the slot SL may not be perfectly perpendicular to each other depending on the etching depth of an etching process and the cross-sectional shape of the slot SL may be approximately rectangular.

The first sides E1 of the slots SL may be oriented at different angles with respect to a reference direction. The reference direction may be arbitrarily selected, for example as a horizontal direction x or a vertical direction y of the beam steering device. Alternatively, the reference direction may be a polarization direction of light. The slots SL of the antenna elements BA may be oriented at different angles with respect to the reference direction. For example, the first sides E1 of the slots SL may be at different angles α with respect to the horizontal direction x. However, it is not necessary that all the slots SL of the antenna elements BA have different oblique angles with each other. For example, some of the slots SL may have the same oblique angle.

For example, the antenna array A may include a first slot SL1, a second slot SL2, a third slot SL3, a fourth slot SL4, and a fifth slot SL5. The first to fifth slots SL1 to SL5 may have different cross-sectional slopes (angles α). Referring to FIG. 2 in which a cross section taken along line II-II of FIG. 1 is shown, the first to fifth slots SL1 to SL5 may have different widths W. In other words, referring to the cross section taken along line II-II of FIG. 1, the first to fifth slots SL1 to SL5 may have increasing cross-sectional widths W.

The propagation direction of light leaving each of the antenna elements BA may be determined by the direction of each of the slots SL of the antenna elements BA, and the propagation direction of light leaving the beam steering device may be varied by synthesis of light output from the antenna elements BA. Therefore, according to the polarization direction of light incident on the beam steering device of the exemplary embodiments, the beam steering device may adjust the propagation direction or exit direction of the light.

Figure 3:
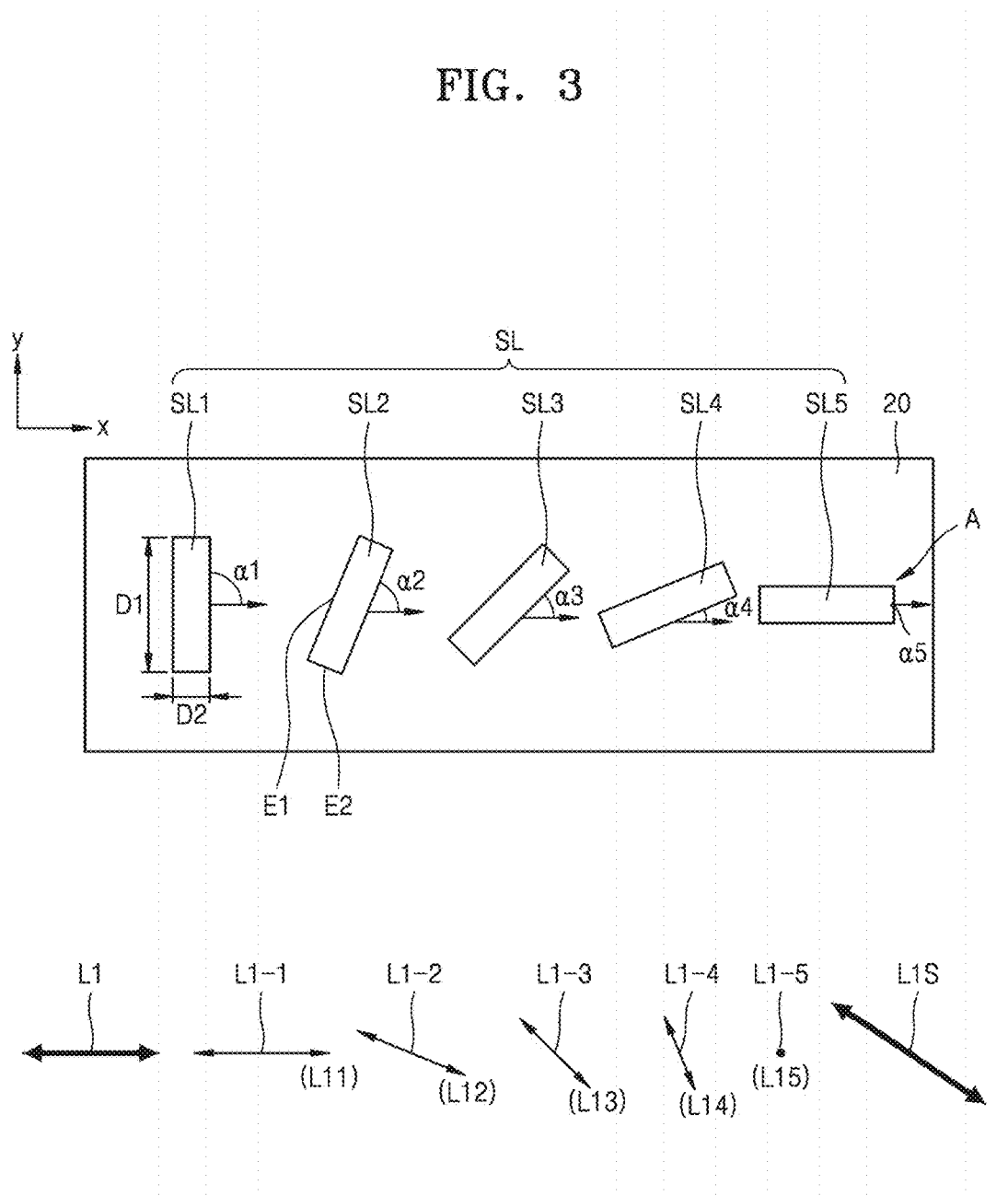
FIG. 3 is a diagram illustrating a propagation direction of light when light having a first polarization direction is incident on the beam steering device depicted in FIG. 1.

FIG. 3 is a diagram illustrating a propagation direction of light when light having a first polarization direction is incident on the antenna array depicted in FIG. 1.

Referring to FIG. 3, the antenna array A includes the first slot SL1, the second slot SL2, the third slot SL3, the fourth slot SL4, and the fifth slot SL5. For example, the first to fifth slots SL1 to SL5 may have the same shape and size. However, the first to fifth slots SL1 to SL5 may have different shapes and sizes.

The first to fifth slots SL1 to SL5 may be oriented in different directions. In a cross section of each of the first to fifth slots SL1 to SL5 taken in a direction transverse to the incident direction of light (x-y plane as shown in FIG. 3), a side having a relatively long length will be referred to as a long side E1, and a side having a relatively short length will be referred to as a short side E2. For example, the long sides E1 of the first to fifth slots SL1 to SL5 may be at angles α1, α2, α3, α4, and α5 with respect to a first direction, and the angles α1, α2, α3, α4, and α5 may satisfy a condition of α1>α2>α3>α4>α5. When light is incident on each of the first to fifth slots SL1 to SL5 from the back of the page in FIG. 3, the exit direction of the light may be determined according to the polarization direction of the light incident on each of the first to fifth slots SL1 to SL5 and the direction of the long side E1 of each of the first to fifth slots SL1 to SL5. For example, if light polarized in a direction perpendicular to a long side E1 of a slot SL is incident on the long side E1 of the slot SL, the light may resonate in the slot SL and may then exit or emit from the slot SL. However, if light polarized in a direction parallel with a long side E1 is incident on the slot SL, the light may not exit the slot SL. In other words, light polarized in a direction perpendicular to a long side E1 of a slot SL may resonate in the slot SL and may then exit the slot SL. If light having an arbitrary polarization direction is incident on a slot SL, a component of the light perpendicular to the long side E1 may exit the slot SL.

As shown in FIG. 3, a first beam L1 having a first polarization direction perpendicular to the y direction is incident on the antenna array. The first polarization direction may be perpendicular to the long side E1 of the first slot SL1. If the first beam L1 having the first polarization direction is incident on the first slot SL1, a component of the beam perpendicular to the long side E1 of the first slot SL1 may exit from the first slot SL1 in a direction perpendicular to the long side E1. In other words, light L1-1 having a propagating direction L11 (both (+) x and (−) x directions) may exit from the first slot SL1. The intensity of light exiting a slot SL may be determined according to the magnitude of a component of the light perpendicular to the long side E1 of the slot SL.

For the same first beam L1 having the first polarization directions, light L1-2 having a propagating direction L12 may exit from the second slot SL2. The direction L12 may be perpendicular to the long side E1 of the second slot SL2. The light L1-2 may be a component of the first beam L1 perpendicular to the long side E1 of the second slot SL2.

Likewise, light L1-3 having a propagating direction L13 may exit from the third slot SL3. The propagating direction L13 may be perpendicular to the long side E1 of the third slot SL3. The light L1-3 may be a component of the first beam L1 perpendicular to the long side E1 of the third slot SL3. The exit directions of light leaving the fourth slot SL4 and the fifth slot SL5 may be determined in the same manner. thus light L1-4 having a direction L14 may exit from the fourth slot SL4. In case of the fifth slot SL5, the long side E1 is parallel with the first polarization direction of the first beam L1, and thus the first beam L1 does not have a component perpendicular to the long side E1 of the fifth slot SL5. Therefore, no light L1-5 may exit from the fifth slot SL5.

As described above, the light L1-1, L1-2, L1-3, L1-4, and L1-5 may exit in different propagating directions with different intensities. If the first beam L1 having the first polarization direction is incident on the antenna array, light L1-1, L1-2, L1-3, L1-4, and L1-5 may be combined together and may be output as a first composite beam L1S. The exit direction and intensity of the first composite beam L1S may be determined according to the directions and intensities of the light L1-1, L1-2, L1-3, L1-4, and L1-5.

Figure 4:
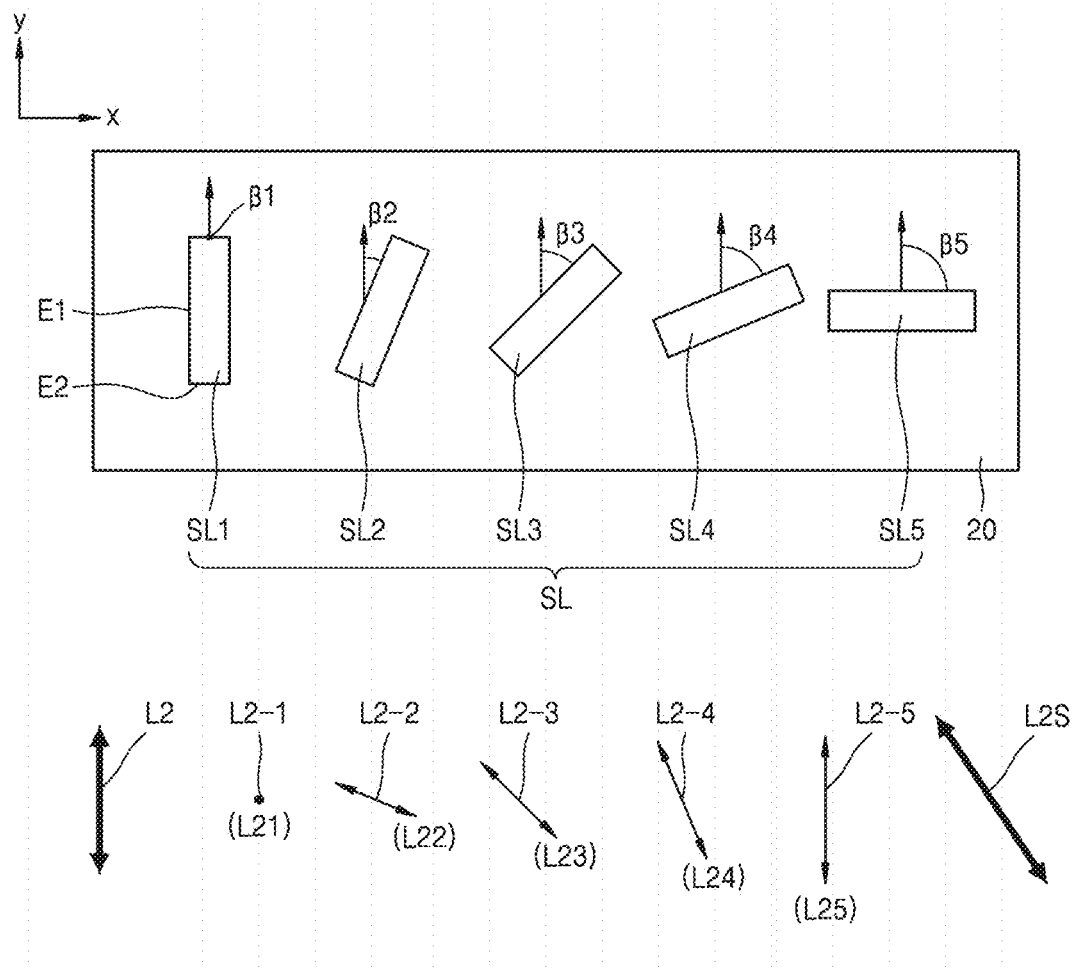
FIG. 4 is a diagram illustrating a propagation direction of light when light having a second polarization direction is incident on the beam steering device depicted in FIG. 1.

FIG. 4 is a diagram illustrating a propagation direction of light when light having a second polarization direction is incident on the antenna array depicted in FIG. 1.

Referring to FIG. 4, second beam L2 having a second polarization direction perpendicular to the x-direction is incident on the antenna array. The second polarization direction may be parallel to the long side E1 of the first slot SL1. For example, the long sides E1 of the first to fifth slots SL1 to SL5 may be at angles β1, β2, β3, β4, and β5 with respect to the (+) y direction, and the angles β1, β2, β3, β4, and β5 may satisfy a condition of β1<β2<β3<β4<β5.

The long side E1 of the first slot SL1 is parallel with the polarization direction of the second beam L2, and thus the second beam L2 does not have a component perpendicular to the long side E1 of the first slot SL1. Therefore, no light L2-1 may exit from the first slot SL1. Light L2-2 having a propagating direction L22 may exit from the second slot SL2. Light L2-3 having a propagating direction L23 may exit from the third slot SL3. Light L2-4 having a propagating direction L24 may exit from the fourth slot SL4. Light L2-5 having a propagating direction L25 may exit from the fifth slot SL5. The light L2-1, L2-2, L2-3, L2-4, and L2-5 may exit in different propagating directions with different intensities. If the second beam L2 having the second polarization direction is incident on the beam steering device, light L2-1, L2-2, L2-3, L2-4, and L2-5 may be combined together and may be output as a second composite beam L2-5. The exit direction and intensity of the second composite beam L2-5 may be determined according to the directions and intensities of the light L2-1, L2-2, L2-3, L2-4, and L2-5.

As described with reference to FIGS. 3 and 4, by adjusting the polarization direction of light incident on the antenna array the beam steering device may adjust the exit direction of the light leaving the antenna array. In addition, the beam steering device may adjust the intensity of output light by varying the intensity of incident light.

In FIGS. 3 and 4, the first to fifth slots SL1 to SL5 of the beam steering device are oriented in different directions. However, some of the slots may be oriented in the same direction. Instead of arranging the first to fifth slots SL1 to SL5 in the order of their slopes, the first to fifth slots SL1 to SL5 may be arranged randomly not on the arranged order.

Alternatively, the first to fifth slots SL1 to SL5 may have different sizes respectively or in combination. A wavelength of light may be selected according to the size (i.e., length and width) of a slot. Because wavelengths of light resonating in a slot are determined by the size of the slot, the transmission wavelength band of the light may be dependent on the size of the slot.

Figure 5:
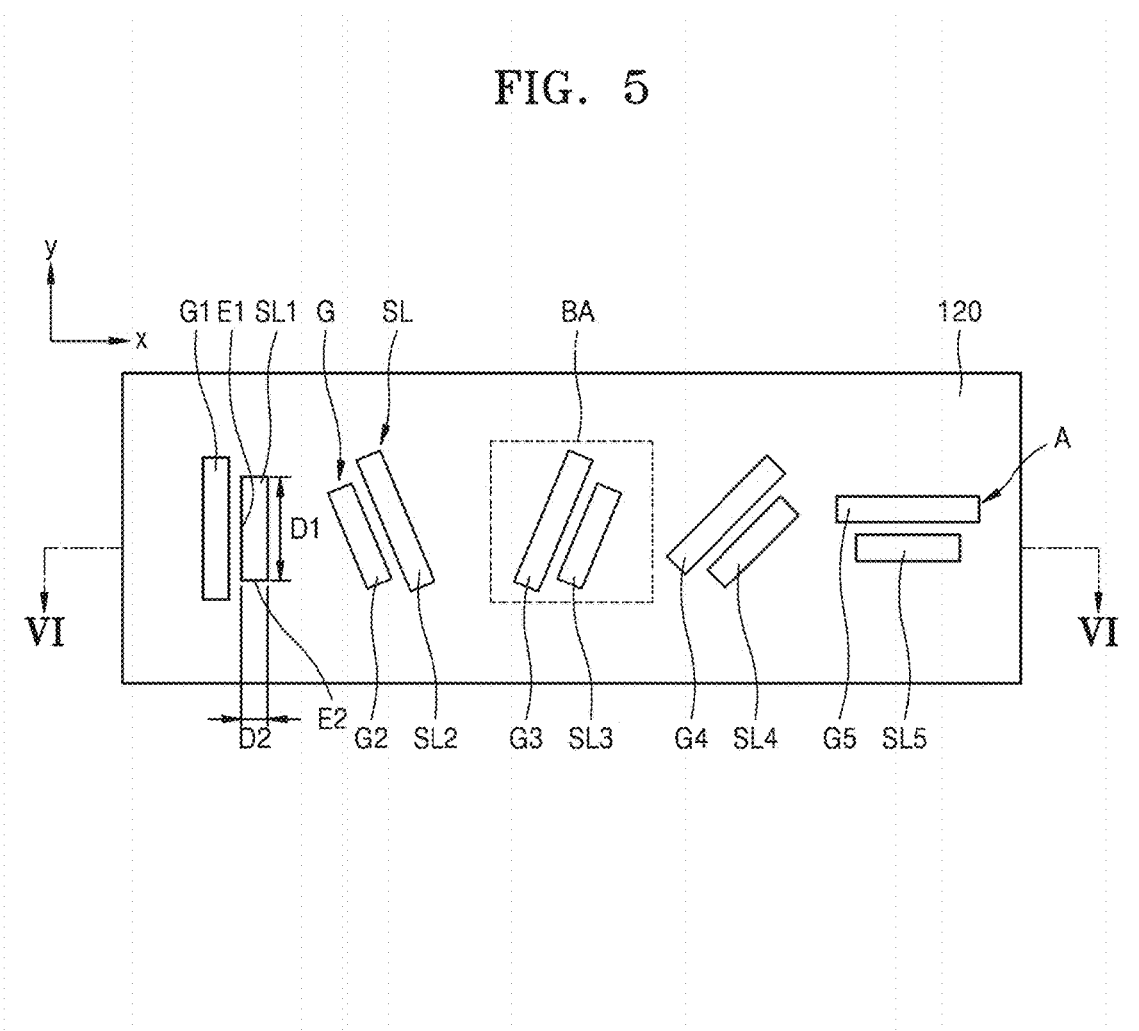
FIG. 5 is a plan view illustrating a beam steering device according to another exemplary embodiment.
Figure 6:
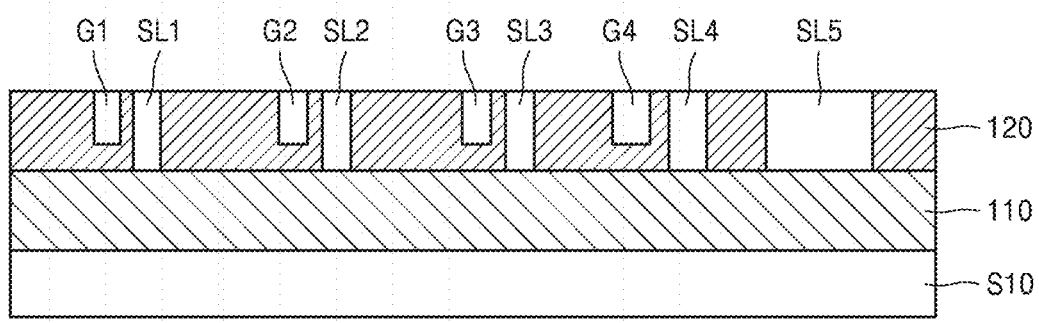
FIG. 6 is a cross-sectional view taken along a line VI-VI of FIG. 5.

FIG. 5 is a plan view illustrating a beam steering device according to another exemplary embodiment, and FIG. 6 is a cross-sectional view taken along a line VI-VI of FIG. 5.

Referring to FIGS. 5 and 6, the beam steering device includes a polarization converter 110 configured to adjust the polarization direction of light emitted from a light source S10, a metal layer 120, and an antenna array A including a plurality of antenna elements BA each having a function dependent on the polarization direction of light.

The antenna elements BA may be basic unit structures for varying the propagation direction of light according to the polarization direction of the light. Each of the antenna elements BA may include a slot SL and at least one groove G adjacent to the slot SL.

The light source S10 may include a light emitting device such as an LED or an LD. The light source S10 may be separate from the polarization converter 110 or may be provided in the form of a layer adjoining the polarization converter 110. The polarization converter 110 may convert light emitted from the light source S10 into a polarized beam. For example, the polarization converter 110 may include a grating device, a liquid crystal layer, or a wire grid polarizer.

The slot SL may have a cross-sectional shape with a first side E1 having a relatively long length D1 and a second side E2 having a relatively short length D2. For example, the slot SL may have a rectangular cross-sectional shape. However, the cross-sectional shape of the slot SL may have a triangular, pentagonal, or hexagonal cross-sectional shape. The cross-sectional shape of the slot SL may be a cross-sectional shape in a direction transverse to the incident direction of light. The slot SL may penetrate the metal layer 120 and the polarization converter 110 may be exposed through lower portions of the slot SL.

The metal layer 120 includes slots SL substantially the same as those included in the metal layer 20 of FIG. 1, and thus a detailed description thereof will be omitted.

The metal layer 120 further includes the grooves G, for example, a first groove G1, a second groove G2, a third groove G3, a fourth groove G4, and a fifth groove G5. The grooves G may be formed in the metal layer 120 to have predetermined depths such that they do not penetrate the metal layer 120. The grooves G may be parallel with the slots SL, respectively. However, the grooves G may be sloped from the slots SL.

If light output from a slot SL is incident on a corresponding groove G, the light may be reflected by the groove G. Light output from a slot SL may propagate in two opposite directions perpendicular to a long side E1 of the slot SL. The light propagating toward a groove G from a corresponding slot SL, for example, may be reflected by the groove G and may combined with the light propagating in the opposite direction from the slot SL. In other words, light exiting a slot SL may be given directivity by a corresponding groove G and may therefore propagate in one direction. The grooves G may function as directors or reflectors.

Figure 7:
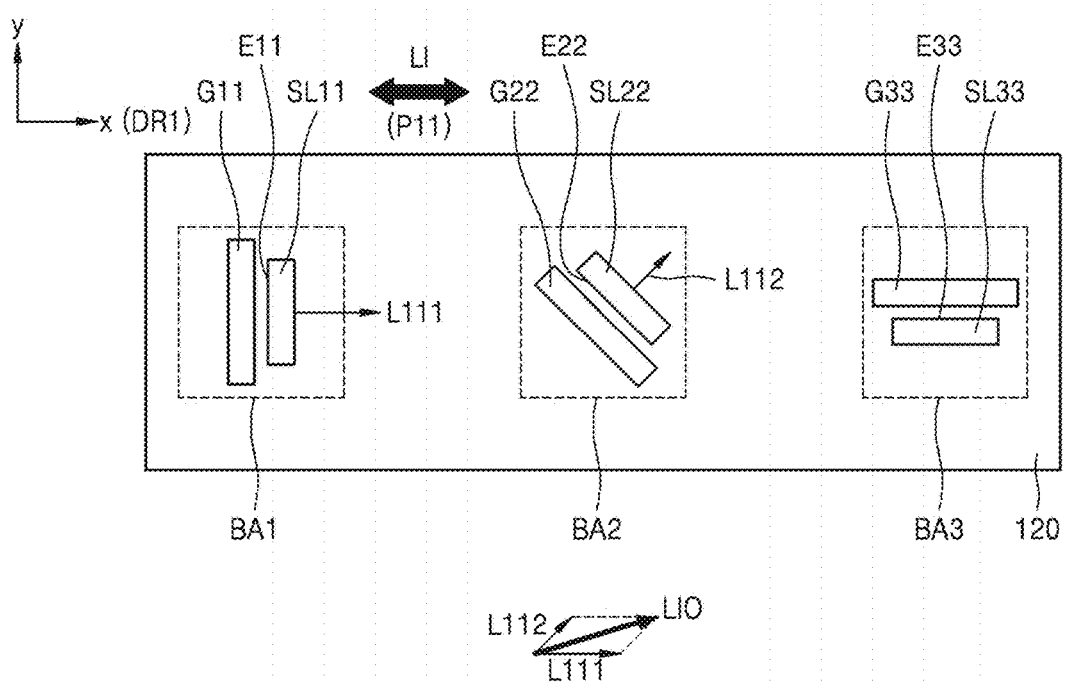
FIG. 7 is a diagram illustrating light propagating in a first direction when light having a first polarization direction is incident on a beam steering device including antenna elements each having a slot and a groove.
Figure 8:
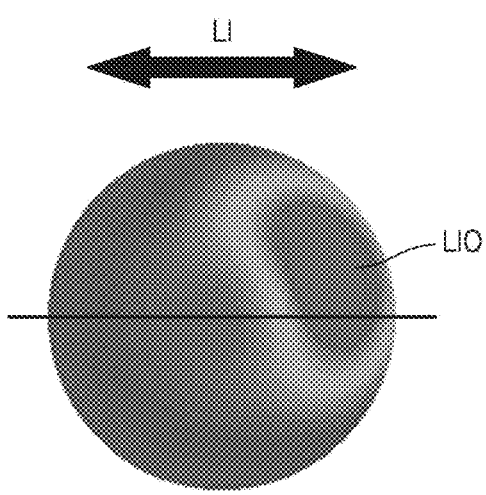
FIG. 8 is a light distribution graph illustrating light output from the beam steering device depicted in FIG. 7 when light having a first polarization direction is incident on the beam steering device.

FIG. 7 is a diagram illustrating light propagating in one direction when light having a polarization direction is incident on a antenna elements each having a slot and a groove. FIG. 8 is a light distribution graph illustrating light output from the beam steering device when light having the polarization direction depicted in FIG. 7 is incident on the beam steering device.

Referring to FIG. 7 the beam steering device includes a first antenna element BA1, a second antenna element BA2, and a third antenna element BA3. The first antenna element BA1 includes a first slot SL11 and a corresponding first groove G11. The second antenna element BA2 includes a second slot SL22 and a corresponding second groove G22. The third antenna element BA2 likewise includes a third slot SL33 and a corresponding third groove G33.

A long side E11 of the first slot SL11 may be perpendicular to a first direction DR1, a long side E22 of the second slot SL22 may be at an angle of 45° with respect to the first direction DR1, and a long side E33 of the third slot SL33 may be parallel with the first direction DR1. For example, the first direction DR1 may be a horizontal direction (+) x of the beam steering device.

A first beam LI having a first polarization direction P11 is incident on the beam steering device. The first beam LI may exit from the first slot SL11 in both directions perpendicular to the long side E11 of the first slot SL11 and the beam propagating forward the first groove G11 may be reflected by it and combined with the beam propagating in a direction L111. The first beam LI may exit from the second slot SL22 in both directions perpendicular to the long side E22 of the second slot SL22 and the beam propagating toward the second groove G22 may be reflected by it and combined with the beam propagating in a direction L112. Because the first beam LI does not have a component perpendicular to the long side E33 of the third slot SL33, no first beam LI may exit from the third slot SL33.

The first beam LI having the first polarization direction P11 incident on the beam steering device is thus transformed into a first output beam LIO having a part propagating in the direction L111 and a part propagating in the direction L112.

FIG. 8 shows the first output beam LIO generated by the beam steering device when the first beam LI having the first polarization direction P11 illustrated in FIG. 7 is incident on the beam steering device.

Figure 9:
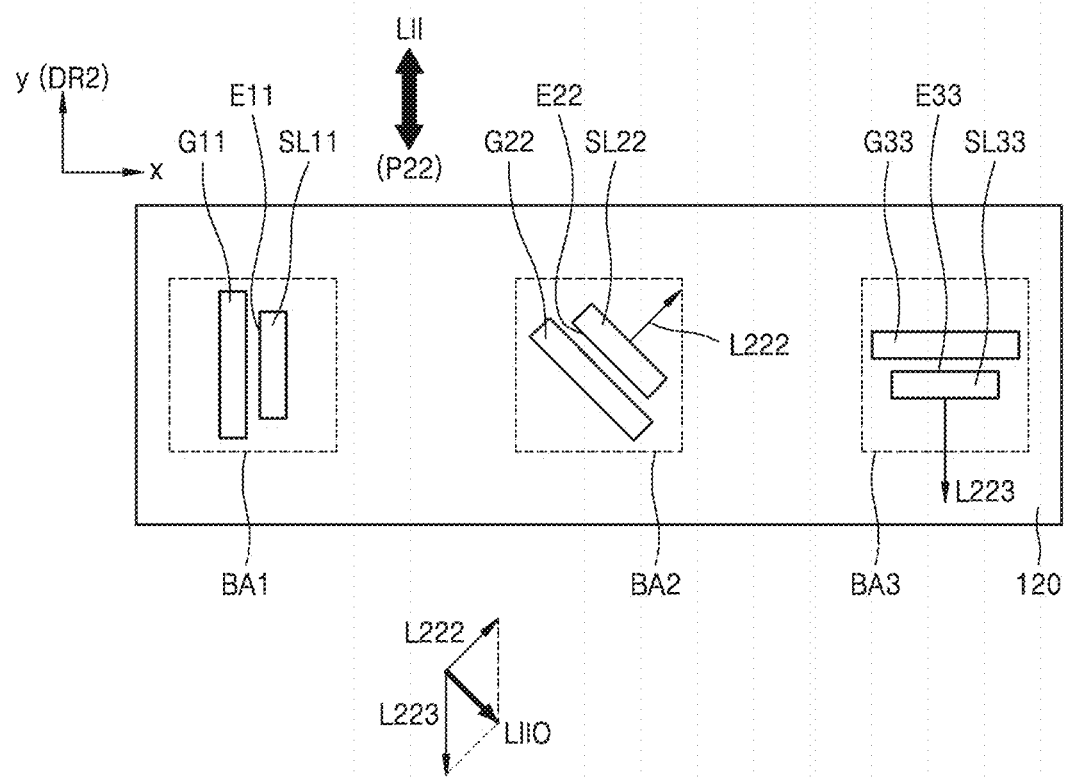
FIG. 9 is a diagram illustrating light propagating in a second direction when light having a second polarization direction is incident on the beam steering device depicted in FIG. 7.
Figure 10:
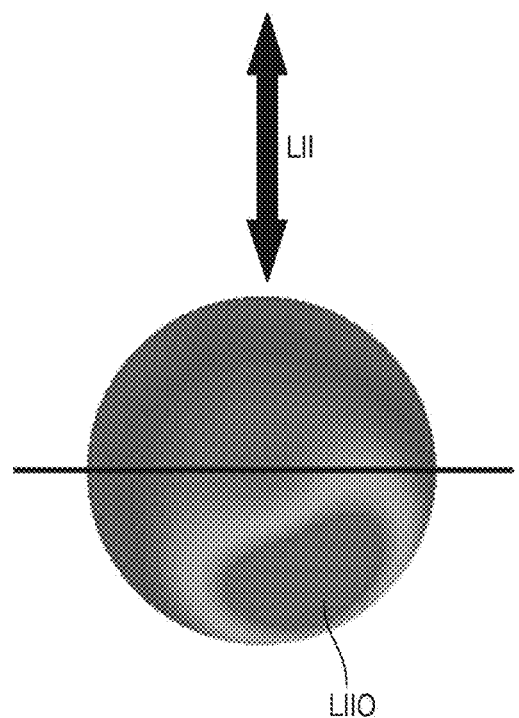
FIG. 10 is a light distribution graph illustrating light output from the beam steering device depicted in FIG. 7 when light having a second polarization direction is incident on the beam steering device.

FIG. 9 is a diagram illustrating light propagating in another direction when light having a different polarization direction is incident on the beam steering device depicted in FIG. 7. FIG. 10 is a light distribution graph illustrating light output from the beam steering device when light having the polarization direction depicted in FIG. 9 is incident on the beam steering device.

Referring to FIG. 9, a second beam LII having a second polarization direction P22 is incident on the beam steering device illustrated in FIG. 7. The second polarization direction P22 may be a second direction DR2 parallel to the long side E11 of the first slot SL11. For example, the second direction DR2 may be a vertical direction (+)y of the beam steering device. Because the second beam LII does not have a component perpendicular to the long side E11 of the first slot SL11, no second beam LII may exit from the first slot SL11.

The second beam LII may exit from the second slot SL22 in both directions perpendicular to the long side E22 of the second slot SL22 and the beam propagating toward the second groove G22 may be reflected by it and combined with the beam propagating in a direction L222. The second beam LII may exit from the third slot SL33 in both directions perpendicular to the long side E33 of the third slot SL33 and the beam propagating toward the third grove G33 may be reflected by it and combined with the beam propagating in a direction L223.

The second beam LII having the second polarization direction P22 may be divided into a part propagating in the direction L222 and a part propagating in the direction L223, and the parts may be combined as a second output beam LIIO.

FIG. 10 shows the second output beam LIIO generated by the beam steering device when the second beam LII having the second polarization direction P22 illustrated in FIG. 9 is incident on the beam steering device.

Referring to FIGS. 7 to 10, although the structure of the beam steering device is not changed, the direction of light exiting from the beam steering device may be adjusted according to the polarization direction of the light incident on the beam steering device. In the above, two polarization directions are described. However, the polarization direction of light may be variously changed to adjust the exit direction of the light. For example, light having a third or fourth polarization direction different from the first and second polarization directions may be directed to the beam steering device to vary the exit direction of the light. Thus, as described above, light may be output from the beam steering device in a plurality of directions by adjusting the polarization direction of the light without varying the structure of the beam steering device.

Figure 11:
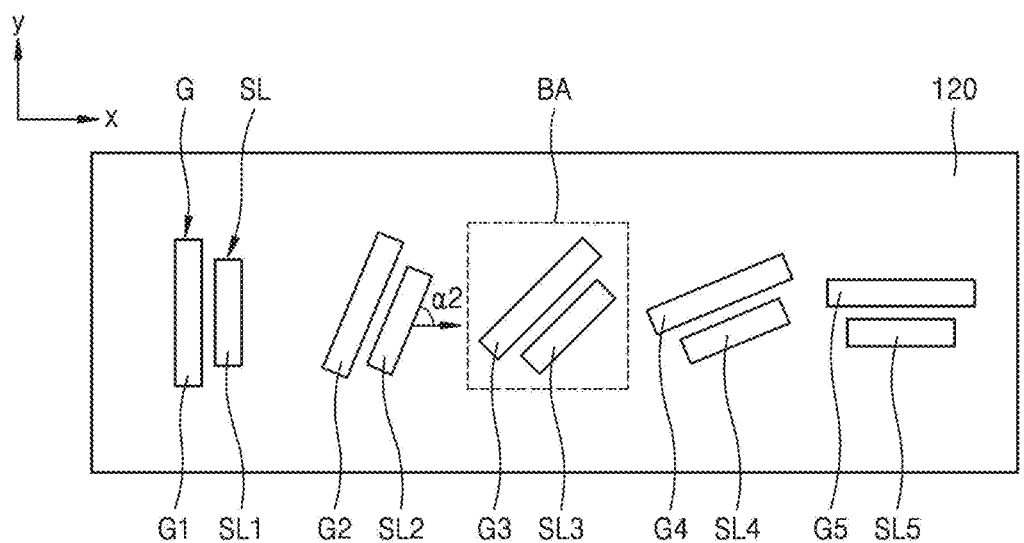
FIG. 11 is a diagram illustrating propagation directions of light when light having first to fifth polarization directions is incident on a beam steering device including antenna elements each having a slot and a groove.

FIG. 11 is a diagram illustrating propagation directions of light when light having first to fifth polarization directions is incident on antenna elements each having a slot and a groove. A beam steering device illustrated in FIG. 11 includes an antenna array A in which first to fifth antenna elements are arranged. The first to fifth antenna elements include first to fifth slots SL1 to SL5 and first to fifth corresponding grooves G1 to G5. For example, the first groove G1 may be disposed at a side of the first slot SL1 in parallel with the first slot SL1. The second to fifth grooves G2 to G5 may be parallel with the second to fifth slots SL2 to SL5, respectively. The first to fifth slots SL1 to SL5 may be oriented in different directions. For example, if a horizontal direction of the beam steering device is referred as an x-axis direction, and a vertical direction of the beam steering device is referred to as a y-axis direction, the first to fifth slots SL1 to SL5 may be oriented such that long sides of the first to fifth slots SL1 to SL5 may be at different angles α2 with respect to the (+) x-axis direction. However, the first to fifth slots SL1 to SL5 are not limited thereto. For example, some of the first to fifth slots SL1 to SL5 may be oriented in the same direction.

If the polarization direction of light incident on the beam steering device illustrated in FIG. 11 is varied, the propagating direction of light output from the beam steering device may be adjusted. For example, if the light beams LI1 to LI5 incident on the beam steering device have first to fifth polarization directions P1 to P5, respectively, first to fifth output beams LO1 to LO5 may be output in different propagating directions. In a lower part of FIG. 11, the first to fifth output beams LO1 to LO5 are illustrated in relation to the first to fifth polarization directions P1 to P5. As the polarization direction of light incident is varied, the direction of light output from the beam steering device is varied. In other words, the output direction of light may be adjusted by varying the polarization direction of incident light.

Figure 12:
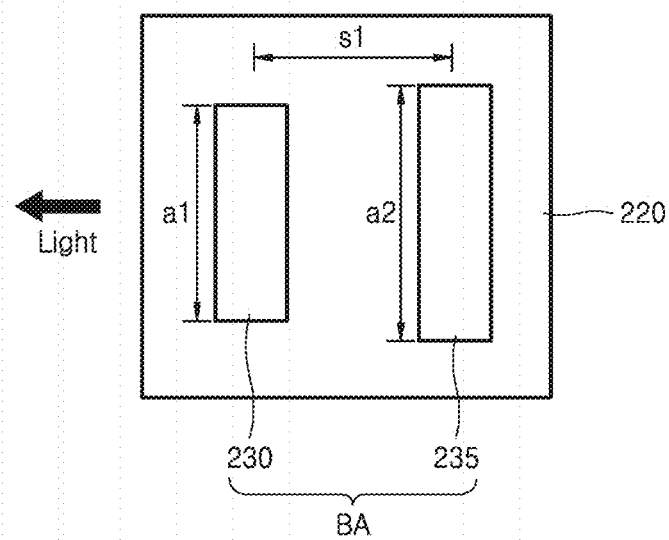
FIG. 12 is a diagram illustrating an antenna element of a beam steering device, according to an exemplary embodiment.
Figure 13:
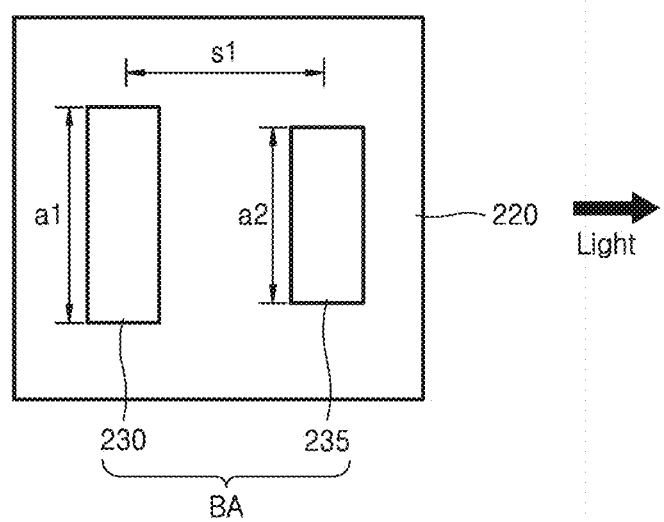
FIG. 13 is a diagram illustrating an antenna element of the beam steering device depicted in FIG. 12 in which sizes of a slot and a groove of the antenna element are varied.

FIG. 12 is a diagram illustrating an antenna element of a beam steering device, according to an exemplary embodiment. FIG. 13 is a diagram illustrating an antenna element of the beam steering device depicted in FIG. 12 in which sizes of a slot and a groove of the antenna element are varied. FIGS. 12 and 13 illustrate basic unit structures of an antenna array of a beam steering device according to an exemplary embodiment. An antenna element includes a slot 230 and a groove 235 in a metal layer. The direction of light output from the beam steering device may be determined according to the sizes of the slot 230 and the groove 235 or the distance s1 between the slot 230 and the groove 235. For example, the direction of light output from the beam steering device may be adjusted if lengths a1 and a2 of the slot 230 and the groove 235 or the distance s1 between the slot 230 and the groove 235 is varied. Alternatively, the direction of light output from the beam steering device may be adjusted by varying the depth of the slot 230 or the groove 235. Alternatively, the direction of light output from the beam steering device may be adjusted by varying the shape of at least one among the slot 230 and the groove 235. In other words, the direction of light output from the beam steering device may be adjusted by varying one or more of the factors relating to the sizes of the slot 230 and the groove 235 (length, depth, etc.), the distance s1 between the slot 230 and the groove 235, and the shapes of the slot 230 and the groove 235.

As shown in FIG. 12, if the length a2 of the groove 235 is greater than the length a1 of the slot 230 (a1<a2), a relatively large portion of light exiting the slot 230 toward the groove 235 may be reflected by and propagate in a direction away from the groove 235, and as a result a relatively small portion of the light may propagate through the groove 235. In this case, the groove 235 may function as a reflector reflecting light exiting from the slot 230.

As shown in FIG. 13, if the length a2 of the groove 235 is less than the length a1 of the slot 230 (a1>a2), a relatively large portion of light exiting the slot 230 toward the groove 235 may be guided by and propagate through the groove 235, and as a result a relatively small portion of the light may propagate in a direction away from the groove 235. In this case, the groove 235 may function as a director guiding light exiting the slot 230. In both cases, the slot 230 may function as a feeder supplying light.

In the above, a method of adjusting the propagation direction of light by varying the sizes of a slot and a groove is described. In another example, however, the propagation direction of light may be adjusted by varying the distance between a slot and a groove, the number of grooves, or the positions of grooves. For example, a plurality of grooves may be disposed at a side of a slot, or at least one groove may be disposed at each lateral side of a slot.

In addition, the wavelength of light exiting from the slot 230 may be varied according to the shape or size (e.g., length and width) of the slot 230. For example, if other conditions are not varied, as the length of the slot 230 increases, light having a longer wavelength may be output from the slot 230.

Figure 14:
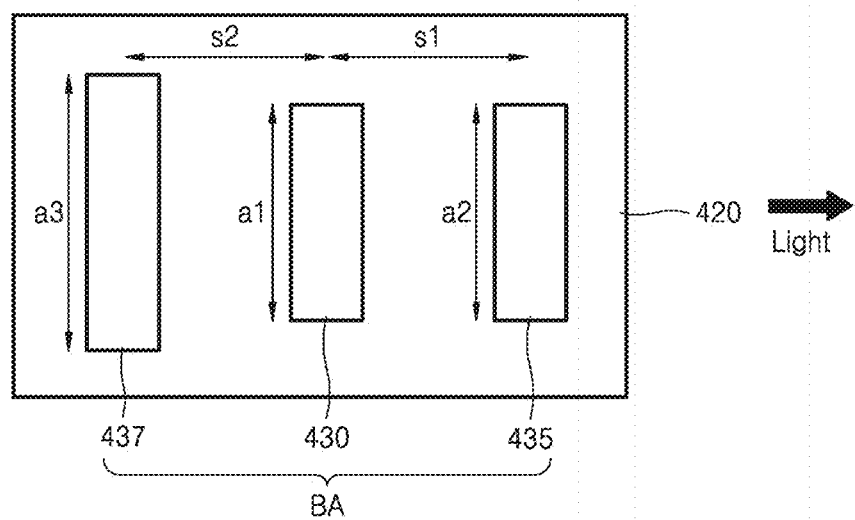
FIGS. 14, 15, and 16 are diagrams illustrating an antenna element of a beam steering device, the antenna element including a slot and two grooves, according to exemplary embodiments.
Figure 15:
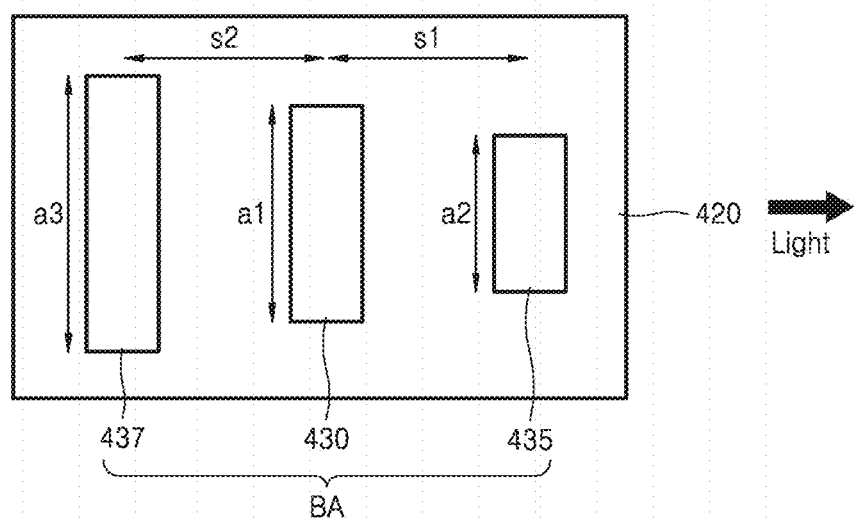
Figure 16:
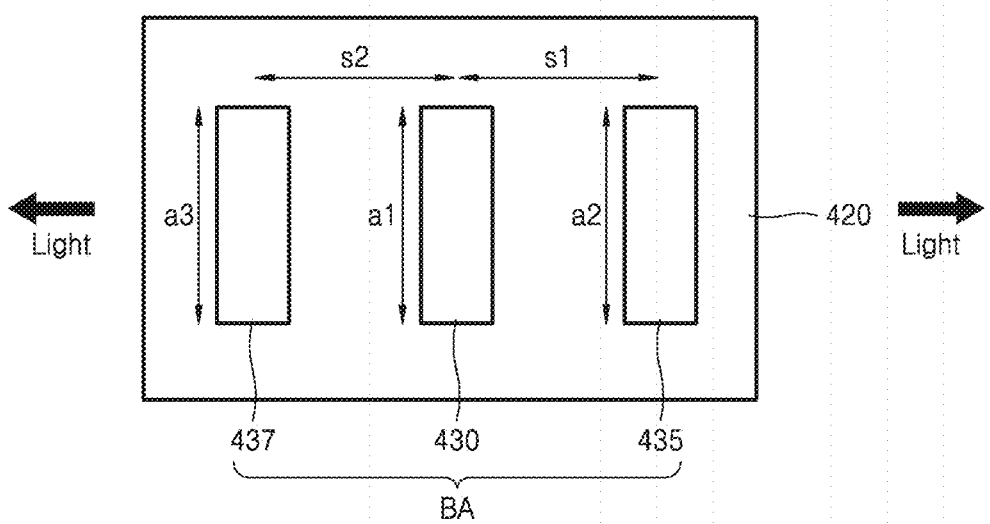

FIGS. 14, 15, and 16 are diagrams illustrating an antenna element including a slot and two grooves, according to exemplary embodiments. Referring to FIGS. 14 to 16, an antenna element BA includes a slot 430 disposed in a metal layer 420, a first groove 435 disposed at a side of the slot 430, and a second groove 437 disposed at an opposite side of the slot 430. For example, a distance s1 between the slot 430 and the first groove 435 may be equal to a distance s2 between the slot 430 and the second groove 437. Referring to FIG. 14, a length a1 of the slot 430 is equal to a length a2 of the first groove 435 (a1=a2), and a length a3 of the second groove 437 is greater than the length a1 (a3>a1=a2).

As shown in FIG. 14, if the length a2 of the first groove 435 is equal to the length a1 of the slot 430, and the length a3 of the second groove 437 is greater than the length a1 of the slot 430, light exiting from the slot 430 may propagate toward the right side in a greater amount than toward the left side. Herein, the terms "left and right sides" are used based on the drawings.

As shown in FIG. 15, if the length a2 of the first groove 435 is less than the length a1 of the slot 430, and the length a3 of the second groove 437 is greater than the length a1 of the slot 430, light exiting from the slot 430 may propagate toward the right side in a greater amount than toward the left side. In this case, the first groove 435 may function as a director, and the second groove 437 may function as a reflector.

As shown in FIG. 16, if the length a1 of the slot 430, the length a2 of the first groove 435, and the length a3 of the second groove 437 are equal, light exiting from the slot 430 may propagate toward the left and right sides substantially in the same amount.

Referring to FIGS. 14, 15, and 16, the propagation direction of light may be adjusted by varying the lengths of the slot 430, the first groove 435, or the second groove 437. Alternatively, the propagation direction of light may be adjusted by varying the distance s1 between the slot 430 and the first groove 435 or the distance s2 between the slot 430 and the second groove 437. Alternatively, the propagation direction of light may be adjusted by varying the depths of the slot 430, the first groove 435, or the second groove 437. Alternatively, the propagation direction of light may be adjusted by varying at least one among the shapes of the slot 430, the first groove 435, or the second groove 437. As described above, the propagation direction of light may be adjusted by varying one of more factors relating to the sizes of the slot 430, the first groove 435, and the second groove 437 (length, width, depth, etc.), the distance s1 between the slot 430 and the first groove 435, the distance s2 between the slot 430 and the second groove 437, and the shapes of the slot 430, the first groove 435, and the second groove 437.

In the example illustrated in FIGS. 14 to 16, the antenna element BA includes one slot and two grooves. However, in another example, an antenna element BA may include two slots and at least three grooves.

As described above, various kinds of antenna elements may be provided by variously combining at least one slot and at least one groove. In other words, various beam steering devices may be provided by arranging various kinds of antenna elements in metal layers in various manners. If the polarization direction of light incident on antenna elements is varied, the output direction of the light may be adjusted according to the array structure of the antenna elements. Properties such as optical efficiency or intensity may also be varied according to the array structure of antenna elements. In addition, information about the relationship between the structure of a beam steering device, and the polarization direction of incident light may be collected in association with various combinations of antenna element structures and arrangements. Based on the information, the optical efficiency and directivity of the beam steering devices of the exemplary embodiments may be variously adjusted.

Figure 17:
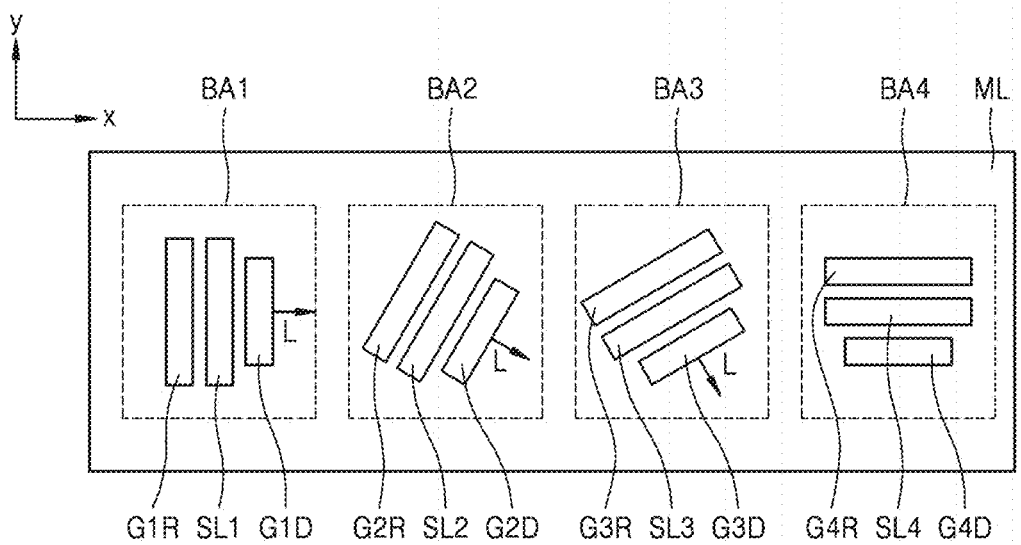
FIG. 17 is a plan view illustrating a beam steering device including antenna elements, each of the antenna elements including a slot and two grooves, according to an exemplary embodiment.

FIG. 17 is a plan view illustrating each antenna element of a beam steering device including a slot and two grooves, according to an exemplary embodiment. In detail, FIG. 17 illustrates an example in which first to fourth antenna elements BA1 to BA4 are disposed in a metal layer ML. The first antenna elements BA1 includes a first slot SL1, a first groove G1D disposed at a side of the first slot SL1, a second groove G1R disposed at an opposite side of the first slot SL1. The first groove G1D may function as a director, and the second groove G1R may function as a reflector. The second antenna elements BA2 includes a second slot SL2, a third groove G2D disposed at a side of the second slot SL2, a fourth groove G2R disposed at an opposite side of the second slot SL2. The third antenna elements BA3 includes a third slot SL3, a fifth groove G3D disposed at a side of the third slot SL3, a sixth groove G3R disposed at an opposite side of the third slot SL3. The fourth antenna elements BA4 includes a fourth slot SL4, a seventh groove G4D disposed at a side of the fourth slot SL4, an eighth groove G4R disposed at an opposite side of the fourth slot SL4. The first to fourth antenna elements BA1 to BA4, each including one slot and two grooves, may be oriented in different directions. If light having a polarization direction is incident on the first to fourth antenna elements BA1 to BA4, light may be output from the first to fourth antenna elements BA1 to BA4 in different directions and may be combined together as composite light In FIG. 17, light having x polarization direction is incident on the beam steering device, and light L exits from each of first to fourth antenna elements BA1 to BA4.

Figure 18:
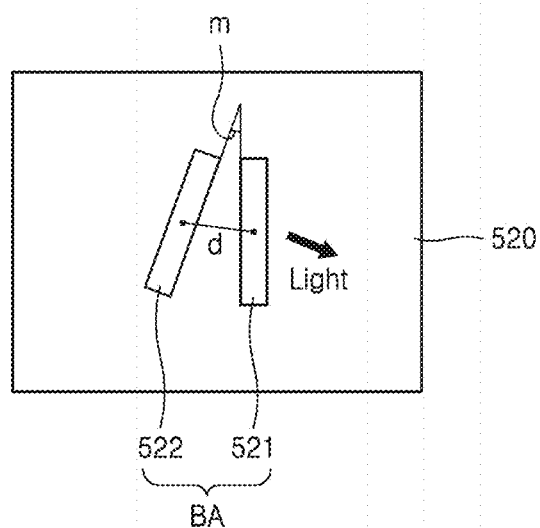
FIG. 18 is a diagram illustrating an antenna element of a beam steering device according to another exemplary embodiment.

FIG. 18 is a diagram illustrating an antenna element of a beam steering device according to another exemplary embodiment. In detail, FIG. 18 illustrates an antenna element BA. For example, the antenna element BA is disposed in a metal layer 520 and includes at least one slot 521 and at least one groove 522. The slot 521 and the groove 522 are separate from each other by a distance d. For example, each of the slot 521 and the groove 522 may have a polygonal cross-sectional shape with a long side and a short side. Here, the long side may refer to a side longer than the short side.

For example, each of the slot 521 and the groove 522 may have a rectangular parallelepiped shape. The slot 521 and the groove 522 may be sloped from each other and may not be parallel with each other. The angle m between an imaginary line extending from the long side of the slot 521 and an imaginary line extending from the long side of the groove 522 may be greater than 0° but less than 180°. If the slot 521 and the groove 522 are not parallel with each other as describe above, light exiting from the slot 521 toward the groove 522 may be reflected by the groove 522 or may propagate through the groove 522. FIG. 18 shows that light exiting from the slot 521 toward the groove 522 is reflected by the groove 522. In other words, an antenna function may be realized. In the example, one slot and one corresponding groove are described. In another example, a plurality of grooves may be provided for a slot. For example, a groove may be provided at a side of a slot, and a plurality of grooves may be provided at an opposite side of the slot. A beam steering device may be configured by arranging such antenna elements in different directions.

Figure 19:
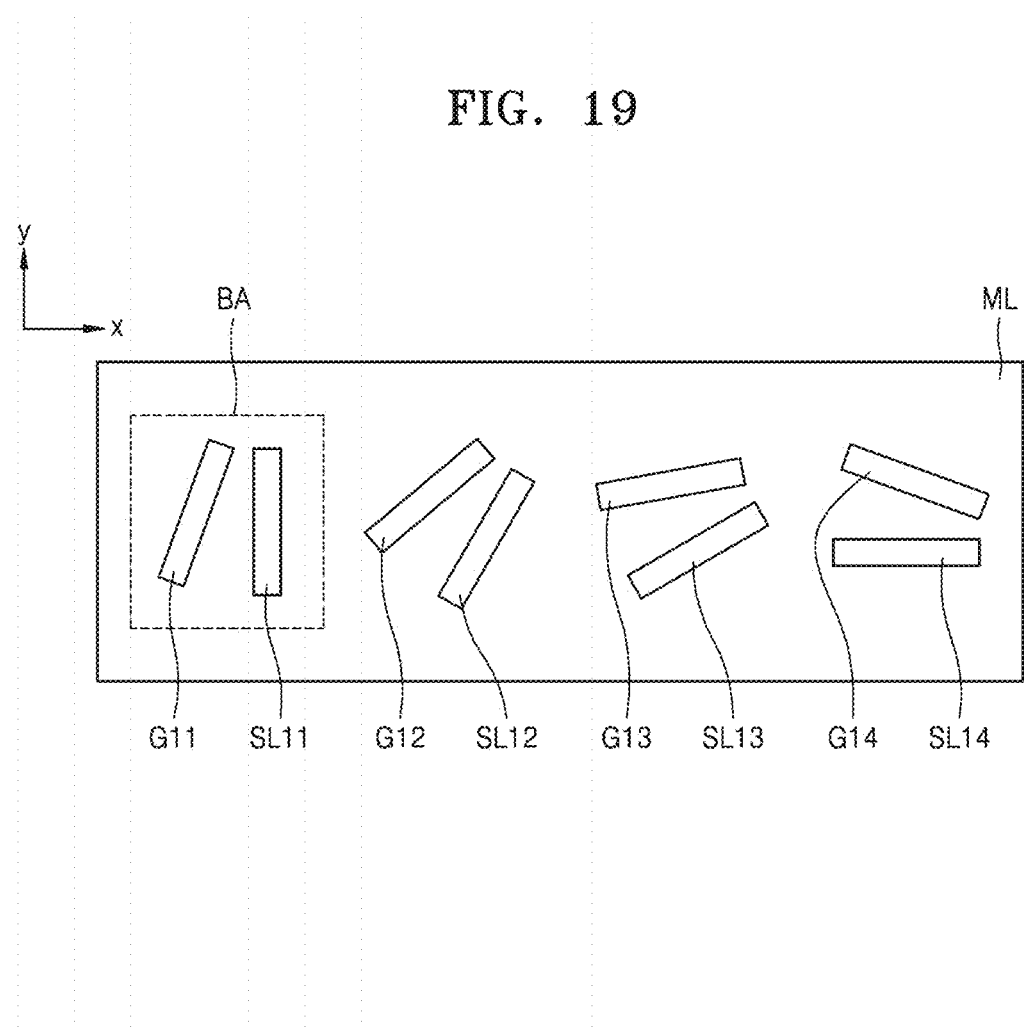
FIG. 19 is a plan view illustrating a beam steering device including antenna elements such as the antenna element depicted in FIG. 18.

FIG. 19 is a plan view illustrating a beam steering device including antenna elements such as the antenna element depicted in FIG. 18. The beam steering device includes a first slot SL11, a first corresponding groove G11, a second slot SL12, a second corresponding groove G12, a third slot SL13, a third corresponding groove G13, a fourth slot SL14, and a fourth corresponding groove G14. The first groove G11 is at an angle with respect to the first slot SL11. The second groove G12 is at an angle with respect to the second slot SL12. The third groove G13 is at an angle with respect to the third slot SL13. The fourth groove G14 is at an angle with respect to the fourth slot SL14. The angles between the first to fourth grooves G11 to G14 and the first to fourth slots SL11 to SL14 may be equal or different. The propagation direction of light output from the beam steering device may be adjusted according to the polarization direction of light incident on the beam steering device by varying or variously combining the number of slots, the arrangement angles of the slots, the number of grooves, and the arrangement angles of the grooves. Data about such various modifications or combinations may be collected, stored, and used.

Figure 20:
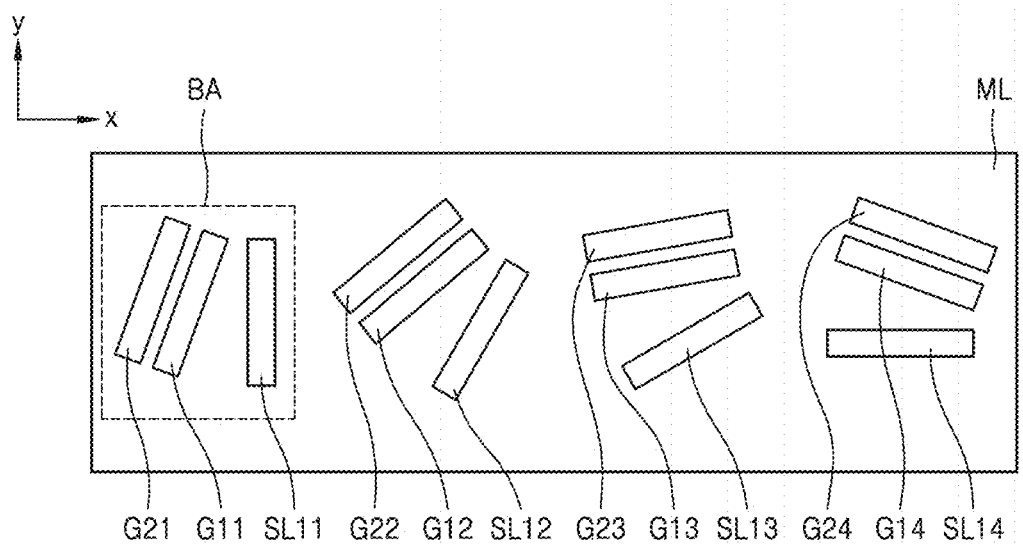
FIG. 20 is a plan view illustrating a beam steering device according to another exemplary embodiment.

FIG. 20 is a plan view illustrating a beam steering device according to another exemplary embodiment. In an example illustrated in FIG. 20, each antenna element BA includes a slot and two grooves corresponding to the slot. For example, two grooves G11 and G21 are disposed at a side of a first slot SL11, two grooves G12 and G22 are disposed at a side of a second slot SL12, two grooves G13 and G23 are disposed at a side of a third slot SL13, and two grooves G14 and G24 are disposed at a side of a fourth slot SL14. For example, because two grooves are provided for each slot, the amount of reflection may be increased, and as a result, the intensity of light output from each slot may be increased.

Figure 21:
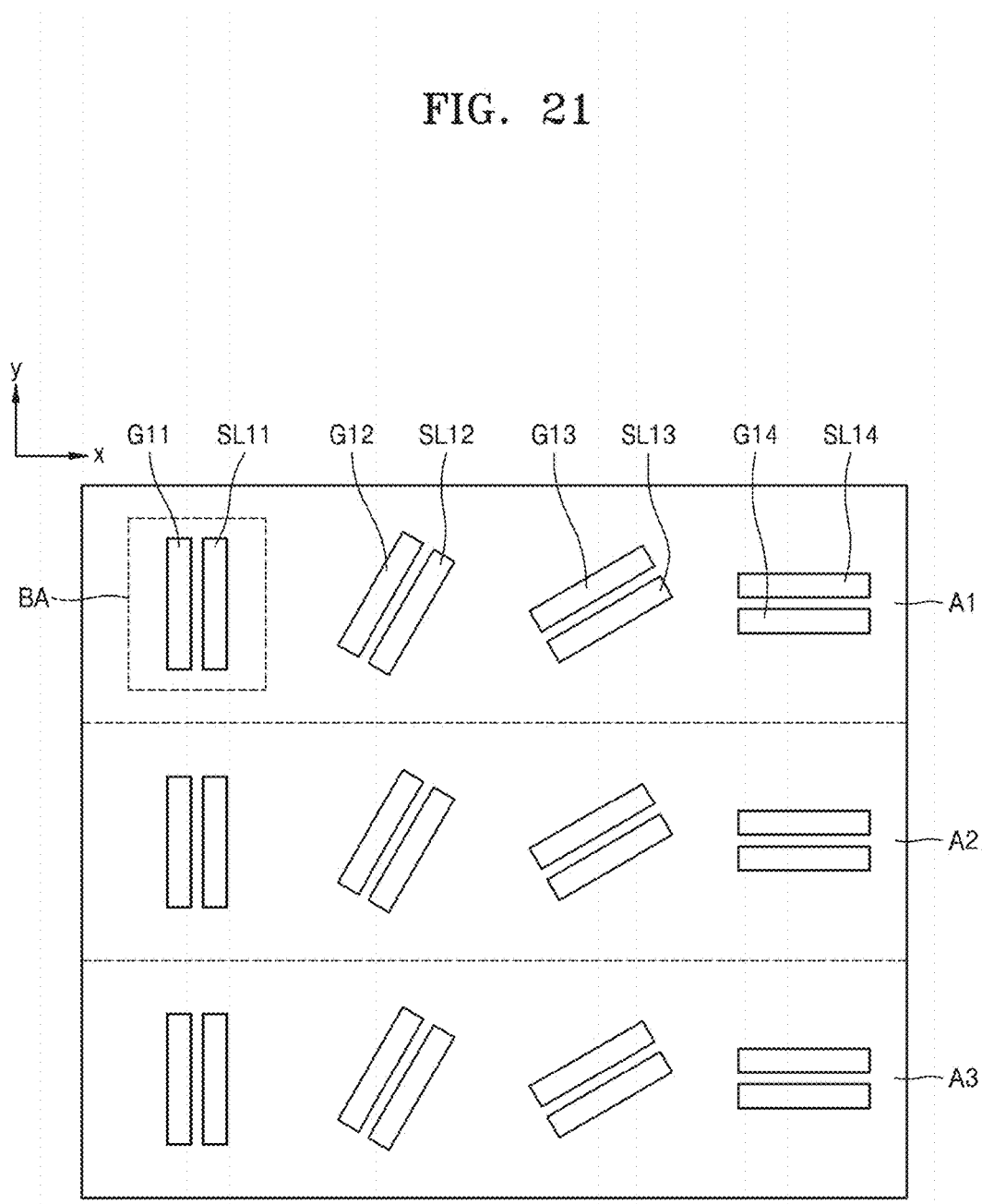
FIG. 21 is a plan view illustrating a beam steering device including antenna arrays in which antenna elements are regularly arranged, according to an exemplary embodiment.

FIG. 21 is a plan view illustrating a beam steering device including antenna arrays in which antenna elements are regularly arranged, according to an exemplary embodiment. For example, the beam steering device includes a first antenna array A1, a second antenna array A2, and a third antenna array A3. Each of the first to third antenna arrays A1 to A3 includes a plurality of antenna elements BA oriented in different directions. The first to third antenna arrays A1 to A3 may have the same arrangement structure. In this case, light propagating in the same direction but having a higher degree of intensity may be output compared to the case of using a single antenna array.

Figure 22:
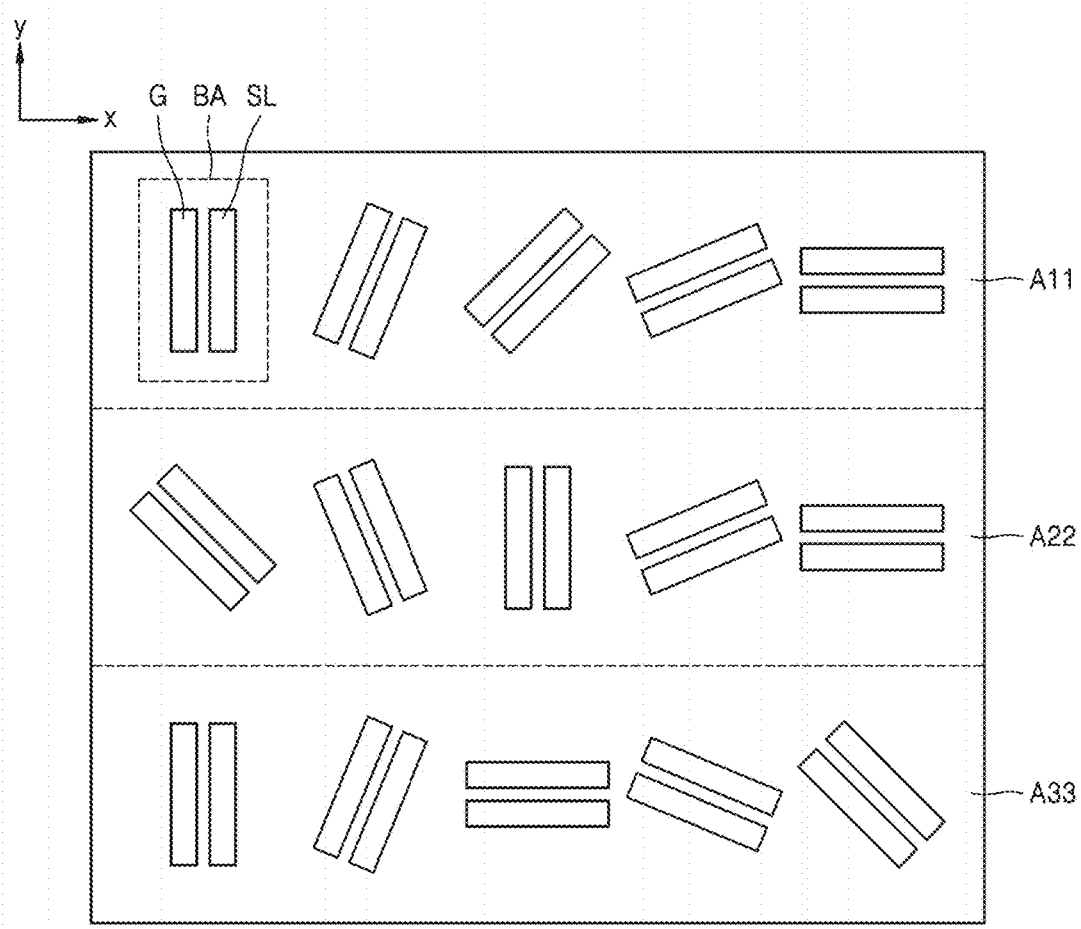
FIGS. 22 and 23 are plan views illustrating a beam steering device including antenna arrays in which antenna elements are irregularly arranged, according to exemplary embodiments.
Figure 23:
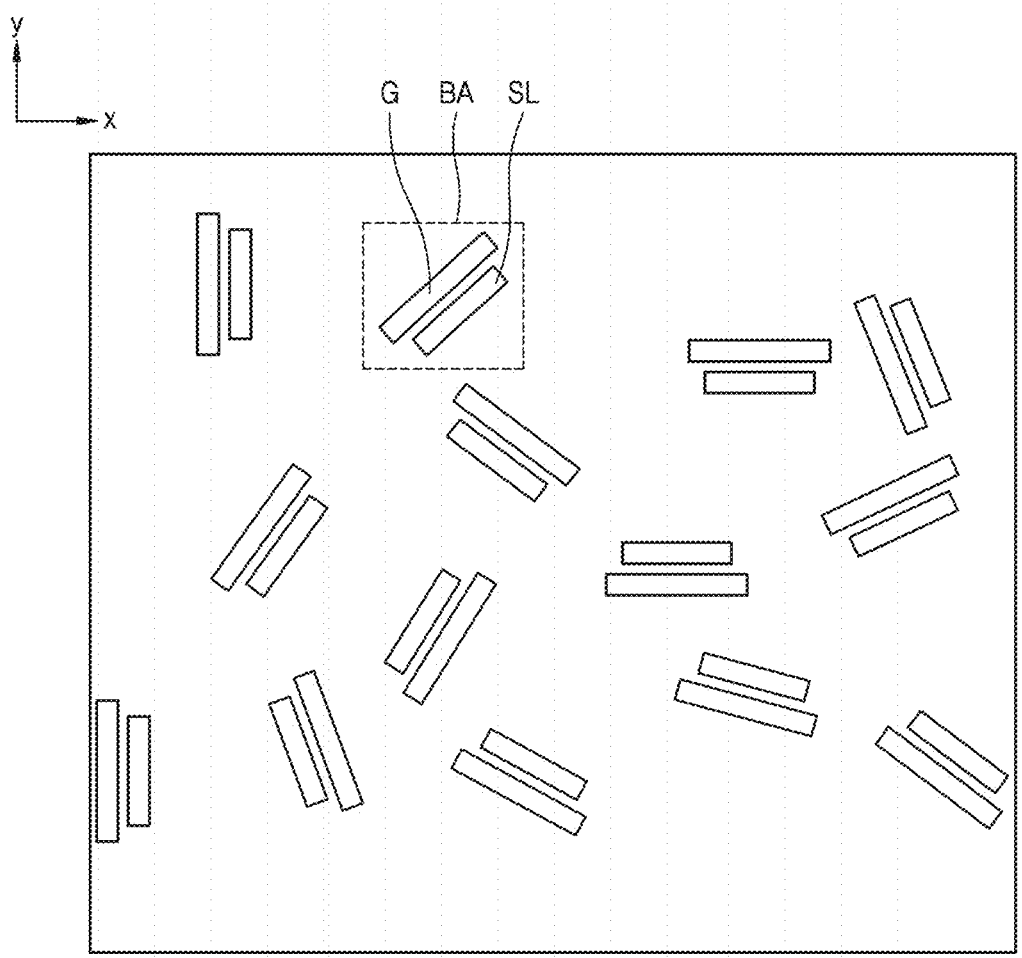

FIGS. 22 and 23 are plan views illustrating a beam steering including antenna arrays in which antenna elements are irregularly arranged, according to exemplary embodiments. A beam steering device illustrated in FIG. 22 includes a first antenna array A11, a second antenna array A22, and a third antenna array A33. The first antenna array A11 includes a plurality of antenna elements BA. Each of the antenna elements BA includes at least one slot SL and at least one groove G. The first to third antenna arrays A11 to A33 have different arrangement structures.

FIG. 23 illustrates a beam steering device including randomly arranged antenna elements BA. The antenna elements BA including slots SL and grooves G oriented in the same direction may allow light having the same polarization direction to propagate in the same direction regardless of the arranged order of the antenna elements BA.

Figure 24:
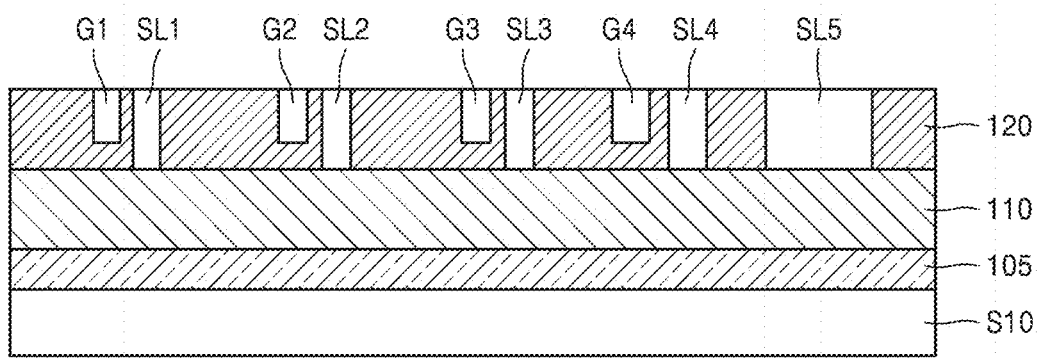
FIG. 24 is a cross-sectional view of the beam steering device depicted in FIG. 6 in which a refractor is added.

FIG. 24 is a cross-sectional view of the beam steering device depicted in FIG. 6 in which a refractor is added. In detail, FIG. 24 illustrates an example in which a refractor 105 is added to the beam steering device illustrated in FIG. 6. Light emitted from the light source S10 may be refracted by the refractor 105 in a direction substantially perpendicular to the polarization converter 110. The refractor 105 may include a material having an electrically adjustable refractive index. For example, the refractor 105 may include a liquid crystal layer. The refractor 105 may direct light toward an upper portion of the beam steering device, and thus the propagation direction of light may be effectively adjusted.

As described above, according to the one or more of the above exemplary embodiments, the beam steering device may adjust the propagation direction of light by adjusting the polarization direction of light incident on the antenna element arrangement structure having at least one intaglio structure. The beam steering device may have a simplified structure because it uses the polarization direction of incident light, not the phase of light, to adjust the propagation direction of light.

The beam steering devices of the exemplary embodiments may be applied to various optical apparatuses. For example, the beam steering devices may be applied to 3D displays, lidars (Light Detection and Ranging), optical antennas, or optical transceivers.

Figure 25:
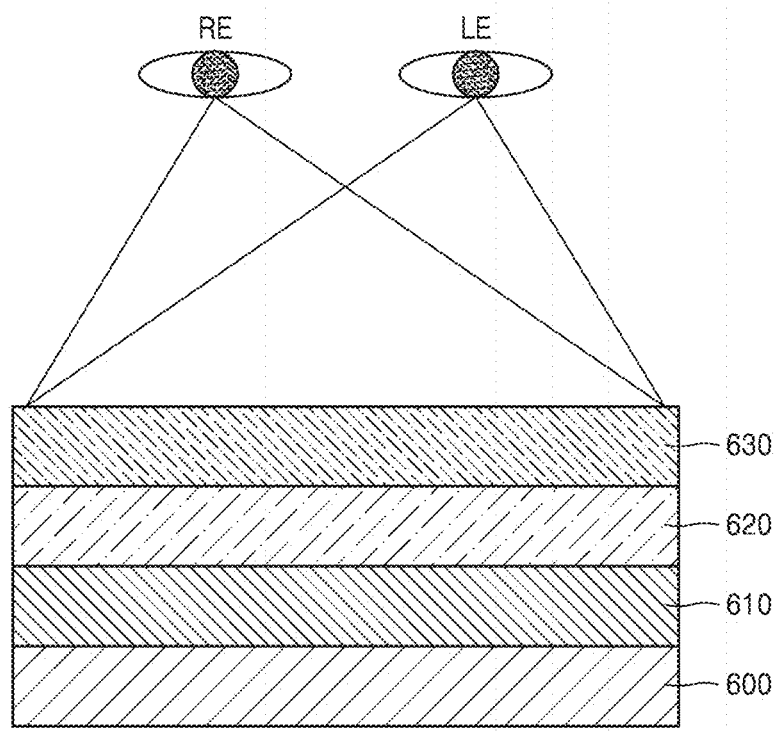
FIG. 25 is a view illustrating an optical apparatus including a beam steering device, according to an exemplary embodiment.

FIG. 25 is a view illustrating an optical apparatus including a beam steering device, according to an exemplary embodiment. The optical apparatus illustrated in FIG. 25 may be included in a 3D display. Referring to FIG. 25, the optical apparatus includes a light source 600, a polarization converter 610 configured to adjust the propagation direction of light, a metal layer 620, and a display panel 630 forming images using light passing through the metal layer 620.

The metal layer 620 may be any one among the metal layers described with reference to FIGS. 1 to 24. For example, the metal layer 620 may include an antenna array in which a plurality of antenna elements BA are arranged in different directions as shown in FIG. 1. A detailed description of the metal layer 620 will not be repeated here. For example, the display panel 640 may include a liquid crystal panel.

Light emitted from the light source 600 may be converted into light having a propagation direction, and the direction of light exiting from the metal layer 620 may be adjusted according to the polarization direction. For example, the polarization converter 610 may output a first beam having a first polarization direction to the metal layer 620. The first beam may output from the metal layer 620 in a first propagating direction. Then, the display panel 630 may use the first beam to output a first image in the first direction. Likewise, the polarization converter 610 may output a second beam having a second polarization direction to the metal layer 620. The second beam may output from the metal layer 620 in a second propagating direction. Then, the display panel 630 may use the second beam to output a second image in the second propagating direction. As shown in FIG. 25, the first image may be provided to the left eye (LE) of a viewer, and the second image may be provided to the right eye (RE) of the viewer. Because the first and second images are respectively provided to the left and right eyes of the viewer, a 3D image may be realized. In addition, the optical apparatus of the exemplary embodiments may display images in many directions such as a third direction and a fourth direction. In other words, the optical apparatus may provide images to multiple viewpoints, and thus, a plurality of viewers may enjoy 3D images.

The beam steering devices of the exemplary embodiments may also be applied to lidars. Lidars are used to measure the distance to an object and physical properties of the object such as density, velocity, or shape by radiating a laser beam toward the object, detecting rays scattered or reflected by the object, and measuring the return time of the rays or other variations of the rays such as intensity, frequency, or polarized state variations. A lidar may use a beam steering device to adjust the direction of light output from the lidar by varying the polarization direction of the light incident on an antenna array.

Figure 26:
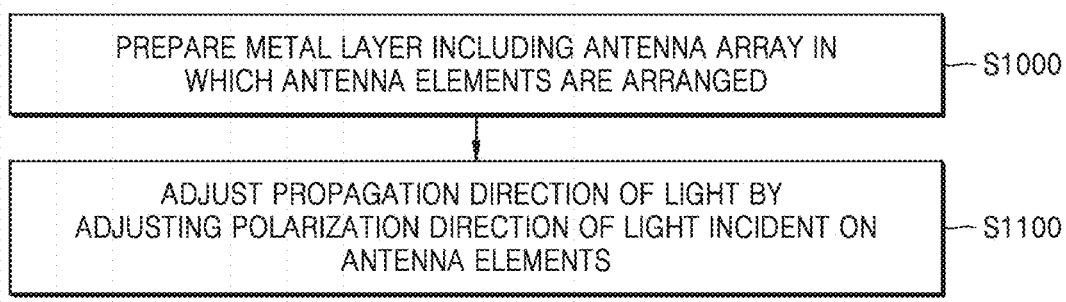
FIG. 26 is a flowchart illustrating a beam steering method according to an exemplary embodiment.

FIG. 26 is a flowchart illustrating a beam steering method according to an exemplary embodiment.

For example, as shown in FIG. 1, in operation S1000, a metal layer 20 including an antenna array A having a plurality of antenna elements BA is prepared. The antenna array A including the antenna elements BA is substantially the same as the antenna arrays described with reference to FIGS. 1 to 24, and thus a detailed description thereof will not be repeated here.

In operation S1100, a propagation direction of light exiting from the antenna elements BA is adjusted by adjusting the polarization direction of light incident on the antenna elements BA.

As described above, according to the one or more of the above exemplary embodiments, the beam steering device may easily adjust the propagation direction of light exiting from it by varying the polarization direction of the light entering it. In addition, the beam steering device may be manufactured in the form of a film for size reduction and integration. The beam steering device may be applied to various optical apparatuses. Because the beam steering device can be manufactured in the form of a film, an apparatus using the beam steering device may have an integrated structure.

The foregoing exemplary embodiments are examples and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A beam steering device comprising:
a polarization converter adjusting a polarization direction of light emitted from a light source; and
an antenna array receiving the light from the polarization converter and emitting light in different propagating directions depending on the polarization direction of the light from the polarization converter,
wherein the antenna array comprises antenna elements comprising slots disposed in a metal layer and grooves disposed in the metal layer, the grooves being separate from and adjacent to the slots, respectively, and the grooves reflecting light beams to have the different propagation directions, respectively, and
a propagation direction of the light is adjusted through synthesis of light dependent on a combination of arrangement directions of the antenna elements and the polarization direction of the light.

2. The beam steering device of claim 1, wherein each of the slots has a cross-sectional shape with relatively long first sides and relatively short second sides, and
the first sides of the slots are disposed at different angles, respectively, from the adjusted polarization direction of the light.

3. The beam steering device of claim 1, wherein a slot and a corresponding groove, among the slots and the grooves, are arranged in a direction different from a direction in which another slot and another groove, among the slots and the grooves, are arranged.

4. The beam steering device of claim 1, wherein the grooves are parallel with the respective corresponding slots.

5. The beam steering device of claim 1, wherein the grooves are sloped from the respective corresponding slots.

6. The beam steering device of claim 1, further comprising another antenna array disposed in the metal layer, the other antenna array comprising other slots arranged in a same manner as the slots of the antenna array.

7. The beam steering device of claim 1, wherein the light beams have a same intensity.

8. The beam steering device of claim 1, wherein the light beams have different intensities, respectively.

9. A beam steering device comprising:
a polarization converter adjusting a polarization direction of light emitted from a light source;
a metal layer receiving the light having the adjusted polarization direction;
slots disposed in the metal layer, each of the slots having a cross-sectional shape with relatively long first sides and relatively short second sides, the first sides of the slots being disposed at different angles, respectively, from the adjusted polarization direction of the light; and
grooves disposed in the metal layer, the grooves being separate from and adjacent to the slots, respectively,
wherein each of the slots and a corresponding one of the grooves consists of an antenna element, and
a propagation direction of the light is adjusted through synthesis of light dependent on a combination of arrangement directions of the antenna elements and the polarization direction of the light.

10. The beam steering device of claim 9, wherein the different propagation directions of light beams are substantially perpendicular to respectively the first sides of the slots on which the light beams are incident.

11. The beam steering device of claim 9, wherein the polarization converter comprises a liquid crystal layer.

12. The beam steering device of claim 9, wherein each of the slots has a rectangular cross-sectional shape.

13. The beam steering device of claim 9, wherein the metal layer comprises at least one among titanium, gold, silver, platinum, copper, aluminum, nickel, and chromium.

14. The beam steering device of claim 9, further comprising a refractor refracting the emitted light.

15. The beam steering device of claim 14, wherein the refractor has an electrically adjustable refractive index.

16. The beam steering device of claim 9, wherein each of distances of the first sides and the second sides is less than a wavelength of the emitted light.

17. An optical apparatus comprising:
a light source configured to emit light;
a polarization converter adjusting a polarization direction of the emitted light;
an antenna array receiving the light from the polarization converter and emitting light in different propagating directions depending on the polarization direction of the light from the polarization converter; and
a display panel configured to generate images for different viewpoints, based on the light having the different propagating directions emitted from the antenna array,
wherein the antenna array comprises antenna elements comprising slots disposed in a metal layer and grooves disposed in the metal layer, the grooves being separate from and adjacent to the slots, respectively, and the grooves reflecting light beams to have the different propagation directions, respectively, and
a propagation direction of the light is adjusted through synthesis of light dependent on a combination of arrangement directions of the antenna elements and the polarization direction of the light.

18. A beam steering method comprising:
adjusting a polarization direction of light that is emitted from a light source by a polarization converter; and
subjecting the light having the adjusted polarization direction to a metal layer having slots oriented in different directions with respect to a propagation direction and grooves disposed in the metal layer, the grooves being separate from and adjacent to the slots, respectively.

19. The beam steering method of claim 18, wherein each of the slots has a cross-sectional shape with relatively long first sides and relatively short second sides.

20. The beam steering method of claim 19, wherein the first sides of the slots are disposed at different angles, respectively, from the adjusted polarization direction of the light, and
the different propagation directions of the light beams are substantially perpendicular to respectively the first sides of the slots on which the light beams are incident.

* * * * *